(12) United States Patent
Sato et al.

(10) Patent No.: US 11,092,744 B2
(45) Date of Patent: Aug. 17, 2021

(54) THREE-DIMENSIONAL SURFACE DISPLAY DEVICE DISPOSED ON A VEHICLE AND VEHICLE DISPLAY DEVICE HAVING A THREE-DIMENSIONAL SURFACE DISPLAY DEVICE

(71) Applicant: KOITO MANUFACTURING CO., LTD., Tokyo (JP)

(72) Inventors: Ryuho Sato, Shizuoka (JP); Akinori Matsumoto, Shizuoka (JP); Haruhiko Iyoda, Shizuoka (JP); Hiroya Koizumi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 10 days.

(21) Appl. No.: 16/500,680

(22) PCT Filed: Apr. 4, 2018

(86) PCT No.: PCT/JP2018/014465
§ 371 (c)(1),
(2) Date: Oct. 3, 2019

(87) PCT Pub. No.: WO2018/186450
PCT Pub. Date: Oct. 11, 2018

(65) Prior Publication Data
US 2020/0088944 A1    Mar. 19, 2020

(30) Foreign Application Priority Data

Apr. 6, 2017 (JP) ............................. JP2017-075753

(51) Int. Cl.
*G02B 6/26* (2006.01)
*B60Q 1/50* (2006.01)

(52) U.S. Cl.
CPC ................ *G02B 6/262* (2013.01); *B60Q 1/50* (2013.01); *B60Q 2400/00* (2013.01)

(58) Field of Classification Search
CPC .......... F21S 43/14; F21S 43/15; F21S 43/237; B60Q 2400/00; G02B 6/262
(Continued)

(56) References Cited

U.S. PATENT DOCUMENTS 3,590,248 A * 6/1971 Chatterton, Jr. ..... G02B 6/4249
398/91
3,825,336 A * 7/1974 Reynolds ............... G03B 27/73
355/1
(Continued)

FOREIGN PATENT DOCUMENTS

JP    2001-043493 A    2/2001
JP    2014-229510 A    12/2014
(Continued)

OTHER PUBLICATIONS

International Search Report issued in PCT/JP2018/014465 dated Jun. 19, 2018 (5 pages).
(Continued)

*Primary Examiner* — Chad H Smith
(74) *Attorney, Agent, or Firm* — Osha Bergman Watanabe & Burton LLP

(57) ABSTRACT

A three-dimensional surface display device that includes a plurality of light-emitting elements that are mounted on a mounting member is disclosed. The three-dimensional surface display device includes a plurality of light guide portions, each of which includes a light incidence surface on one end side and a light extraction surface on the other end side. The light incidence surface is arranged to face the corresponding light emitting element. The plurality of light guide portions are different in at least one length, and the
(Continued)

light extraction surfaces are arranged three-dimensionally adjacent to each other.

5 Claims, 8 Drawing Sheets

(58) Field of Classification Search
USPC .......................................................... 385/116
See application file for complete search history.

(56) References Cited

U.S. PATENT DOCUMENTS

| | | | | |
|---|---|---|---|---|
| 3,830,667 A * | 8/1974 | Carpenter | ................ | C03B 37/15 156/155 |
| 3,832,488 A * | 8/1974 | Fahey | ........................ | B41J 2/46 178/15 |
| 4,208,363 A * | 6/1980 | Yevick | ............. | B29D 11/00278 264/1.24 |
| 4,275,950 A * | 6/1981 | Meyer | ...................... | G02B 3/00 126/698 |
| 4,311,999 A * | 1/1982 | Upton | .................. | G02B 27/017 340/407.1 |
| 4,483,585 A * | 11/1984 | Takami | .................... | A61B 1/07 385/115 |
| 5,412,749 A * | 5/1995 | Sayegh | ................ | G02B 6/0005 385/115 |
| 5,508,892 A * | 4/1996 | Laczynski | ............... | G09F 9/305 362/583 |
| 5,799,126 A * | 8/1998 | Nagatani | ............. | G02B 6/4298 385/146 |
| 5,832,168 A * | 11/1998 | Yenter | ..................... | G09F 9/305 385/147 |
| 5,862,278 A * | 1/1999 | Brauch | ............. | B23K 26/0604 385/119 |
| 6,195,016 B1 * | 2/2001 | Shankle | .................. | G09F 9/305 340/815.42 |
| 6,377,739 B1 * | 4/2002 | Richardson | ................ | B41J 2/46 385/115 |
| 6,571,043 B1 * | 5/2003 | Lowry | ..................... | G02B 6/06 345/40 |
| 7,403,680 B2 * | 7/2008 | Simbal | ................. | G02B 6/4204 257/98 |
| 8,277,104 B2 * | 10/2012 | Jeong | ................... | G02B 6/0061 362/601 |
| 2003/0103744 A1 * | 6/2003 | Koyama | ............ | H04N 5/23238 385/116 |
| 2003/0235380 A1 * | 12/2003 | Thayer | ..................... | G02B 6/06 385/116 |
| 2010/0188742 A1 * | 7/2010 | Chen | .................. | G02B 21/0064 359/385 |
| 2010/0253949 A1 * | 10/2010 | Adler | ................... | A61B 5/0084 356/479 |
| 2015/0362144 A1 * | 12/2015 | Bauer | ................... | F21S 41/255 362/511 |
| 2015/0369447 A1 * | 12/2015 | Lanchava | ............ | G02B 6/0006 362/583 |
| 2016/0116662 A1 * | 4/2016 | Sato | ...................... | G02B 6/0051 362/520 |
| 2017/0280970 A1 * | 10/2017 | Sartor | ................... | A61B 1/0684 |
| 2018/0289257 A1 * | 10/2018 | Ikegami | ............... | A61B 3/1225 |
| 2020/0114580 A1 * | 4/2020 | Hunze | ................... | B29C 64/153 |

FOREIGN PATENT DOCUMENTS

| | | |
|---|---|---|
| JP | 2015-050148 A | 3/2015 |
| JP | 2016-505198 A | 2/2016 |
| JP | 2016-085827 A | 5/2016 |

OTHER PUBLICATIONS

Written Opinion of the International Searching Authority issued in PCT/JP2018/014465 dated Jun. 19, 2018 (5 pages).

* cited by examiner

IV

III

II

I

THREE-DIMENSIONAL SURFACE DISPLAY DEVICE DISPOSED ON A VEHICLE AND VEHICLE DISPLAY DEVICE HAVING A THREE-DIMENSIONAL SURFACE DISPLAY DEVICE

TECHNICAL FIELD

The present invention relates to a three-dimensional surface display device and a vehicle display device.

BACKGROUND

Conventionally, in a normal vehicle operated by a driver, a stop lamp, a taillight, a direction indicator, or the like are manually operated in order to indicate a traveling state of the vehicle to other vehicles, a pedestrian, or the like around the vehicle. In recent years, an automatic driving technique of a vehicle has been remarkably developed, and an environment in which a situation in which various operations of the vehicle are substituted by an information processing means provided in the vehicle is being established. In the automatic driving technique, since the information processing means operates the vehicle based on detection results of various sensors, complex information can be instantaneously processed. Therefore, a traveling state or the like can be indicated to other vehicles, a pedestrian, or the like using an image display device. Patent Document 1 proposes a technique of providing an image display device in a vehicle and displaying various information on the outside of the vehicle.

PATENT DOCUMENT

Patent Document 1: JP-A-2001-043493

SUMMARY OF INVENTION

However, in the related art of Patent Document 1, it is necessary to separately attach the image display device to the vehicle, and a position at which the image display device can be attached and a size of the image display device are restricted to a shape of the vehicle. In addition, in order to attach an existing image display device, a flat plate-shaped member is attached to an outer periphery of the vehicle, which significantly impairs a design of the vehicle.

In a case of using an image display device having a curved surface shape, since it is necessary to individually design a shape according to the design of the vehicle and an attaching position at the vehicle, a versatility is poor and a manufacturing process is complicated. In addition, even if the curved surface shape of the image display device is designed individually, it is not possible to obtain a sense of unity between the vehicle and the image display device by attaching to the outer periphery of the vehicle, so that the design is impaired.

The present invention has been made in view of the above conventional problems, and an object thereof is to provide a three-dimensional surface display device and a vehicle display device capable of obtaining a sense of unity with a vehicle while displaying an image corresponding to a three-dimensional curved surface shape with a simple structure.

In order to solve the above problems, according to embodiments of the present invention, there is provided a three-dimensional surface display device including a plurality of light emitting elements which are mounted on a mounting member; and a plurality of light guide portions, each of which includes a light incidence surface on one end side and a light extraction surface on the other end side, and is arranged to face the corresponding light emitting element, wherein the plurality of light guide portions are different in at least one length, and the light extraction surfaces are arranged three-dimensionally adjacent to each other.

In the three-dimensional surface display device of the present invention, the plurality of light guide portions having the light incidence surfaces facing the light emitting elements are provided, and the light extraction surfaces are arranged three-dimensionally adjacent to each other with different lengths of the light guide portions. Therefore, according to the above configuration, it is possible to obtain a sense of unity with a vehicle while displaying an image corresponding to a three-dimensional curved surface shape with a simple structure.

In one or more embodiments of the invention, the light guide portion includes an optical fiber at least a part.

In one or more embodiments of the invention, a light expanding portion configured to expand a diameter of light emitted from a light emitting end surface of the optical fiber to substantially the entire area of the light extraction surface is further included.

In one or more embodiments of the invention, the light guide portion includes a translucent columnar member, and one end surface of the columnar member is the light extraction surface.

In one or more embodiments of the invention, the light extraction surface is formed with a light scattering structure for scattering and extracting light.

In one or more embodiments of the invention, a three-dimensional shaped outer panel formed of a translucent material is further included, and the light extraction surfaces are arranged along an inner surface of the outer panel.

According to embodiments of the invention, there is provided a vehicle display device including any one of the three-dimensional surface display devices described above, wherein the outer panel is arranged on an exterior portion of a vehicle.

According to the present invention, it is possible to provide the three-dimensional surface display device and the vehicle display device capable of obtaining the sense of unity with the vehicle while displaying the image corresponding to the three-dimensional curved surface shape with the simple structure.

DETAILED DESCRIPTION

Figure 1A:
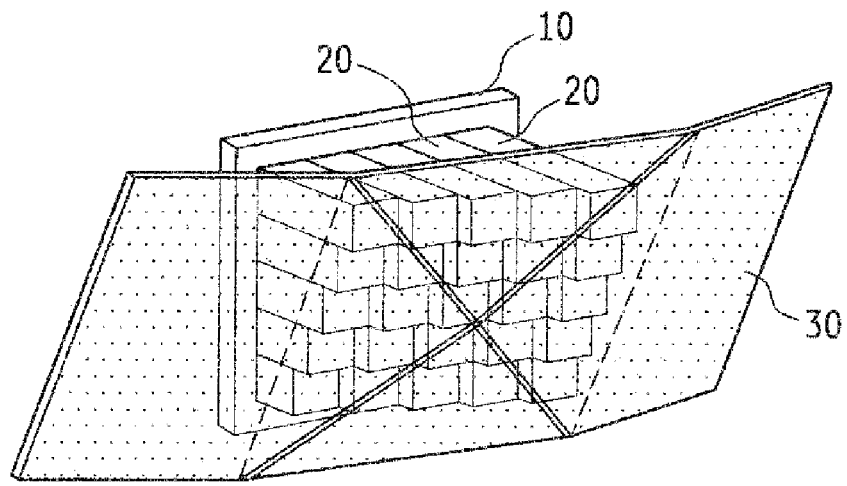
FIG. 1A is a schematic perspective view showing a three-dimensional surface display device 100 according to one or more embodiments of the present invention.
Figure 1B:
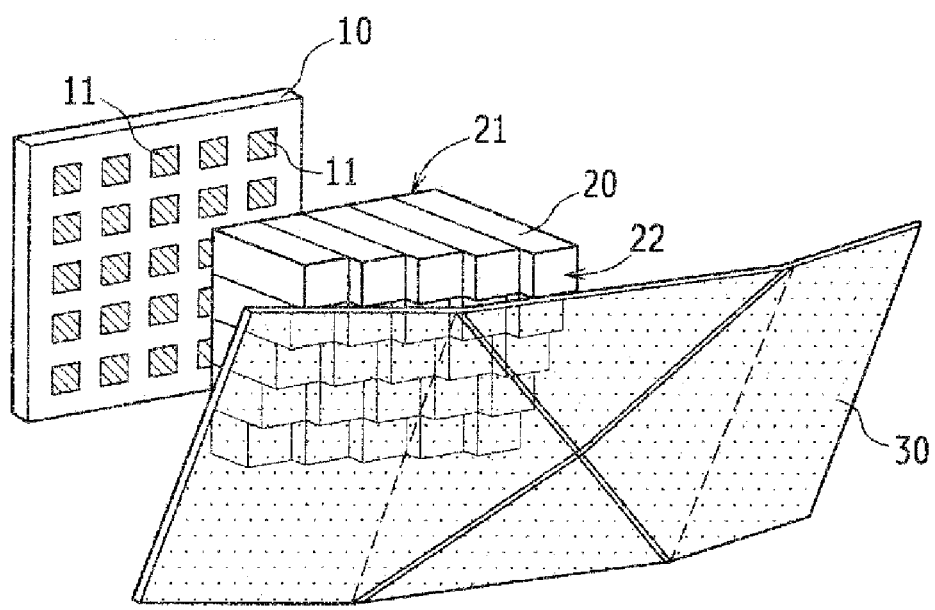
FIG. 1B is an exploded perspective view showing the three-dimensional surface display device 100 according to one or more embodiments of the present invention.

Hereinafter, embodiments of the present invention will be described in detail with reference to the drawings. The same or equivalent components, members, and processes illustrated in the drawings are denoted by the same reference numerals, and a repetitive description thereof will be omitted. FIGS. 1A and 1B are schematic views showing a three-dimensional surface display device 100 according to the present embodiment, FIG. 1A is a schematic perspective view, and FIG. 1B is an exploded perspective view. As shown in FIGS. 1A and 1B, the three-dimensional surface display device 100 includes a mounting member 10, a plurality of light guide portions 20, and an outer panel 30.

The mounting member 10 is a member on which a plurality of light emitting elements 11 are mounted, and a wiring pattern (not shown) for supplying electric power to each of the light emitting elements 11 is formed. The mounting member 10 is not limited in a material as long as it can hold the plurality of light emitting elements 11 and supplies the electric power, and a known printed wiring substrate, a ceramic substrate, a composite substrate, or the like can be used. In order to satisfactorily dissipate heat generated by light emission of the light emitting elements 11, the mounting member 10 is preferably made of a material having a good thermal conductivity. Although FIGS. 1A and 1B show an example in which the light emitting elements 11 are mounted in a matrix on the substantially rectangular flat plate-shaped mounting member 10, other polygonal shapes or circular shapes may be used, or a curved surface shape or a polyhedral shape may also be used.

Each of the light emitting elements 11 is a member which is mounted on the mounting member 10, is electrically connected to the corresponding wiring pattern, and emits light of a predetermined color and intensity by supplying the electric power. As the light emitting element 11, a light emitting diode (LED), an organic electro luminescence (EL), or the like can be used. Although the light emitting element 11 can use a package which emits a single color, a color image can be displayed on the three-dimensional surface display device 100 by using a package which can emit RGB colors. As an example, the light emitting element 11 uses a full-color LED package in which a red LED, a green LED, and a blue LED are each included in a single package, an electrode is provided corresponding to each color, and a light intensity of each of the RGB colors is adjusted according to the electric power supplied to each electrode, so that a desired color can be emitted by mixing colors.

Each of the light guide portions 20 is a substantially columnar member made of a material which transmits light from the light emitting element 11, and one end surface thereof is a light incidence surface 21 and the other end surface thereof is a light extraction surface 22. Specific examples of the material include glass, acrylic resin, epoxy resin, polycarbonate, or the like. The light incidence surfaces 21 are arranged to face the respective light emitting elements 11 mounted on the mounting member 10, and the light from the light emitting elements 11 is incident to the light incidence surfaces 21. In order to make the light to be incident to the light incidence surfaces 21 from the light emitting elements 11 satisfactorily, it is preferable to make a distance between each of the light emitting elements 11 and the corresponding light incidence surface 21 shorter and uniform. In addition, in order to improve an optical coupling efficiency between the light emitting element 11 and the corresponding light guide portion 20, it is preferable to form an antireflection film or a lens shape on the light incidence surface 21.

The light extraction surfaces 22 are arranged three-dimensionally adjacent to each other, and the light propagated through the light guide portions 20 is extracted to the outside from the light extraction surfaces 22. In a side surface portion of each of the light guide portions 20, since the light propagating inside is substantially totally reflected due to a difference in a refractive index, almost all of an amount of light incident from the light incidence surfaces 21 is extracted from the light extraction surfaces 22 without leakage of light from the side surface portion. In addition, a reflective film may be formed on a side surface of each of the light guide portions 20 so that the light propagating inside the light guide portions 20 does not leak from the side surface portion. In order to reduce a directivity of the light extracted to the outside from the light extraction surfaces 22 and improve a visibility from multiple directions, it is preferable to form a light scattering structure for scattering and extracting the light such as minute unevenness on surfaces of the light extraction surfaces 22.

The plurality of adjacent light extraction surfaces 22 are three-dimensionally arranged along an inner surface shape of the outer panel 30, and the light from the light emitting elements 11 is extracted to the outside of the three-dimensional surface display device 100 via the light extraction surfaces 22 and the outer panel 30. Since the light incidence surface 21 of the light guide portion 20 faces the light emitting element 11, each of the light extraction surfaces 22 functions as a pixel corresponding to the light emitting element 11. Since the light guide portions 20 are provided to the respective light extraction surfaces 22 arranged along the inner surface shape of the outer panel 30 from the respective light incidence surfaces 21 arranged to face the corresponding light emitting element 11 on the mounting member 10, a length of each of the light guide portions 20 differs according to the inner surface shape of the outer panel 30.

The outer panel 30 is a plate-shaped member made of a material which transmits at least a part of light and has a three-dimensional curved shape. In addition, the outer panel 30 is a member arranged on an exterior portion of the vehicle, and an outer surface thereof functions as a part of an exterior surface of the vehicle. As described above, the plurality of light extraction surfaces 22 are three-dimensionally arranged along the inner surface of the outer panel 30, and the light extracted from the light extraction surfaces 22 is transmitted through the outer panel 30 and is visible from the outside of the vehicle.

Specific examples of the material forming the outer panel 30 include glass, acrylic resin, epoxy resin, polycarbonate, or the like. Since the outer panel 30 is a part of the exterior surface of the vehicle, the polycarbonate is most preferable from a viewpoint of weight reduction, an impact resistance, a weather resistance, a translucency, or the like. The outer panel 30 may be made of a transparent material having a high translucency, and the light extraction surfaces 22 may be directly visible from the outside. Besides, the light extraction surfaces 22 may also not be directly visible from the outside as a structure in which the light is scattered and transmitted by forming the light scattering structure on the inner surface of the outer panel 30 and mixing a light scattering member.

A control unit (not shown) which supplies electric power to the mounting member 10 is connected to the three-dimensional surface display device 100. The control unit is an information processing means including various computing devices, an internal storage device, an external storage device, an information communication means, and various sensors. The control unit may be a part of the information processing means of an automatic driving technique of the vehicle, or may be configured by an information processing means different from the automatic driving technique. The control unit generates information such as a driving situation and a traveling state to be presented to the outside of the vehicle as image information, determines a light emission color and a light emission intensity of each light emitting element 11 in correspondence with a pixel of the image information, and supplies appropriate electric power to each light emitting element 11.

The plurality of light emitting elements 11 arranged in a matrix on the mounting member 10 emit light with the light emission color and emission intensity of each pixel according to the image information, and the light is incident on the facing light incidence surfaces 21. As described above, the light incident on the light incidence surfaces 21 propagates inside the light guide portions 20, and is extracted from the light extraction surfaces 22 to the outside of the three-dimensional surface display device 100 via the outer panel 30.

Since each of the light extraction surfaces 22 forms a pixel corresponding to the light emitting element 11, it is possible to display an image of a three-dimensional surface according to the curved surface shape of the outer panel 30 in the three-dimensional surface display device 100.

In the three-dimensional surface display device 100 according to the present embodiment, the light extraction surfaces 22 can be three-dimensionally arranged adjacent to each other along the inner surface of the outer panel 30 by only adjusting the lengths of the light guide portions 20 according to the shape of the outer panel 30, and it is possible to display a three-dimensional image with a simple structure. In addition, since the light emitted from the light emitting elements 11 is extracted from the light extraction surfaces 22, a light emitting area can be secured as compared with a case where the light emitting elements 11 are arranged close to the outer panel 30 to emit light in a dot shape. Therefore, even when a picture, a character, or the like is displayed, it is possible to improve an identification of a contour of the image and to facilitate information transmission. Further, the outer panel 30 is a part of the exterior of the vehicle, so that a visibility from the outside of the vehicle can be improved, and a novel appearance can be realized, thereby enhancing a sense of unity with the vehicle and a design.

In FIGS. 1A and 1B, each of the light guide portions 20 is a quadrangular prism having a substantially square cross section, but may have another cross-sectional shape, such as a triangular prism, a hexagonal prism, or a cylinder. When the quadrangular prism having the substantially square cross section is used, since the light extraction surfaces 22 can be arranged in a matrix, it is preferable that pixels for image display are easily configured. In addition, FIGS. 1A and 1B show an example in which the cross-sectional shapes in the plurality of light guide portions 20 and the light extraction surfaces 22 are the same, but the shape of the light extraction surfaces 22 can be set according to content displayed by the three-dimensional surface display device 100. For example, the light guide portion 20 may include an icon shape light extraction surface 22 which displays specific information.

Figure 2A:
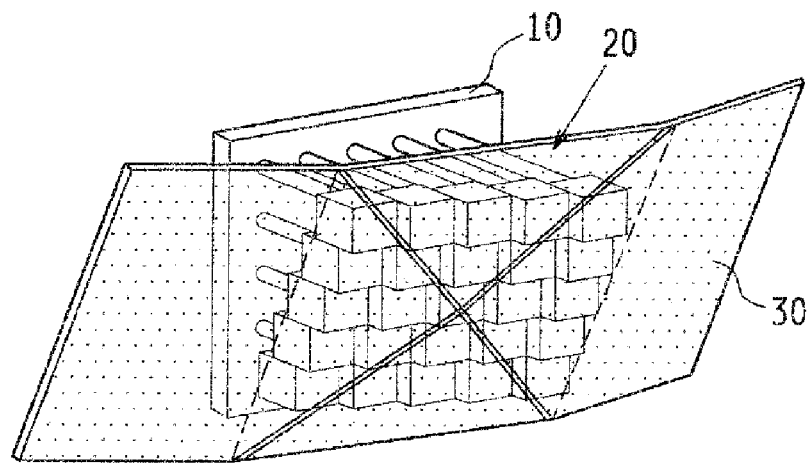
FIG. 2A is a schematic perspective view showing a three-dimensional surface display device 110 according to one or more embodiments of the present invention.
Figure 2B:
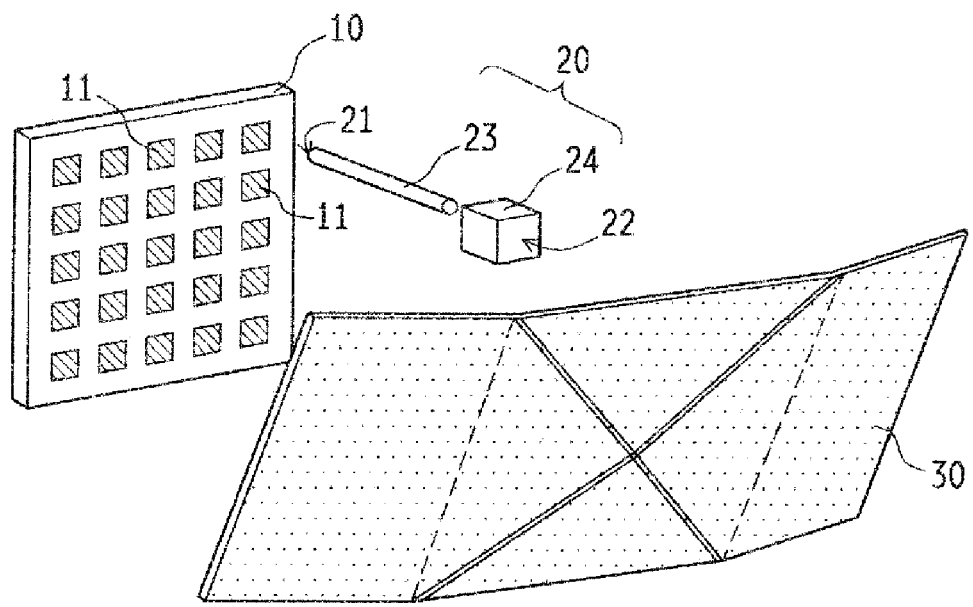
FIG. 2B is an exploded perspective view showing the three-dimensional surface display device 110 according to one or more embodiments of the present invention.

Next, another embodiment of the present invention will be described with reference to FIGS. 2A and 2B. Descriptions that are the same as those of the previous embodiment will be omitted. FIGS. 2A and 2B are schematic views showing a three-dimensional surface display device 110 according to the present embodiment, FIG. 2A is a schematic perspective view, and FIG. 2B is an exploded perspective view. Also in the present embodiment, the three-dimensional surface display device 110 includes the mounting member 10, the light guide portions 20, and the outer panel 30. The present embodiment is different from the previous embodiment in that each of the light guide portions 20 includes an optical fiber 23 and a columnar member 24. In FIG. 2B, one optical fiber 23 and one columnar member 24 are described for simplification, but the three-dimensional surface display device 110 includes the same number of optical fibers 23 and columnar members 24 as the light emitting elements 11 as shown in FIG. 2A.

The optical fiber 23 is a substantially linear flexible member made of a translucent material. One end surface of the optical fiber 23 is the light incidence surface 21 and is arranged to face the corresponding light emitting element 11, and the other end surface of the optical fiber 23 is a light emitting surface and is optically coupled to the corresponding columnar member 24. In order to improve the optical coupling efficiency between the light emitting element 11 and the corresponding optical fiber 23, it is preferable to form an antireflection film or a lens shape on the light incidence surface 21.

The columnar member 24 is a substantially columnar member made of a material which transmits light from the light emitting element 11, and one end surface thereof is optically coupled to the optical fiber 23, and the other end surface thereof is the light extraction surface 22. The light extraction surfaces 22 are arranged three-dimensionally adjacent to each other, and the light propagated through the light guide portions 20 is extracted to the outside from the light extraction surfaces 22. The plurality of columnar members 24 may have different lengths, but when the lengths of all the columnar members 24 are made uniform as shown in FIG. 2A, the parts can be shared and the number of parts can be reduced.

In side surface portions of the optical fibers 23 and the columnar members 24, since the light propagating inside is substantially totally reflected due to the difference in the refractive index, almost all of the amount of the light incident from the light incidence surfaces 21 is extracted from the light extraction surfaces 22 without the leakage of the light from the side surface portions. In order to reduce the directivity of the light extracted to the outside from the light extraction surfaces 22 and improve the visibility from the multiple directions, it is preferable to form the light scattering structure for scattering and extracting the light such as minute unevenness on the surfaces of the light extraction surfaces 22. The lengths of the plurality of optical fibers 23 from the respective light incidence surfaces 21 to the respective light emitting surfaces are different, and the length of the columnar member 24 to the light extraction surface 22 is adjusted by adjusting the length of the optical fiber 23.

The plurality of adjacent light extraction surfaces 22 are three-dimensionally arranged along the inner surface shape of the outer panel 30, and the light from the light emitting elements 11 is extracted to the outside of the three-dimensional surface display device 110 via the light extraction surfaces 22 and the outer panel 30.

The light incident on the light incidence surfaces 21 propagates inside the respective optical fibers 23 and the respective columnar members 24, and is extracted from the respective light extraction surfaces 22 to the outside of the three-dimensional surface display device 110 via the outer panel 30. Since each of the light extraction surfaces 22 forms a pixel corresponding to the light emitting element 11, it is possible to display an image of a three-dimensional surface according to the curved surface shape of the outer panel 30 in the three-dimensional surface display device 110.

In the three-dimensional surface display device 110 according to the present embodiment, since the light guide portion 20 includes the optical fiber 23 and the columnar member 24, the length of the columnar member 24 having a larger cross-sectional area than that of the optical fiber 23 can be shortened, so that the entire light guide portion 20 can be reduced in weight. In addition, since the lengths of the entire light guide portions 20 can be adjusted by adjusting the lengths of the respective optical fibers 23, the number of parts can be reduced by making the columnar members 24 all the same length and sharing parts. Further, since the optical fiber 23 is a flexible linear member, a distance between the mounting member 10 and the outer panel 30 can be increased, and a degree of freedom in layout can be improved.

Figure 3:
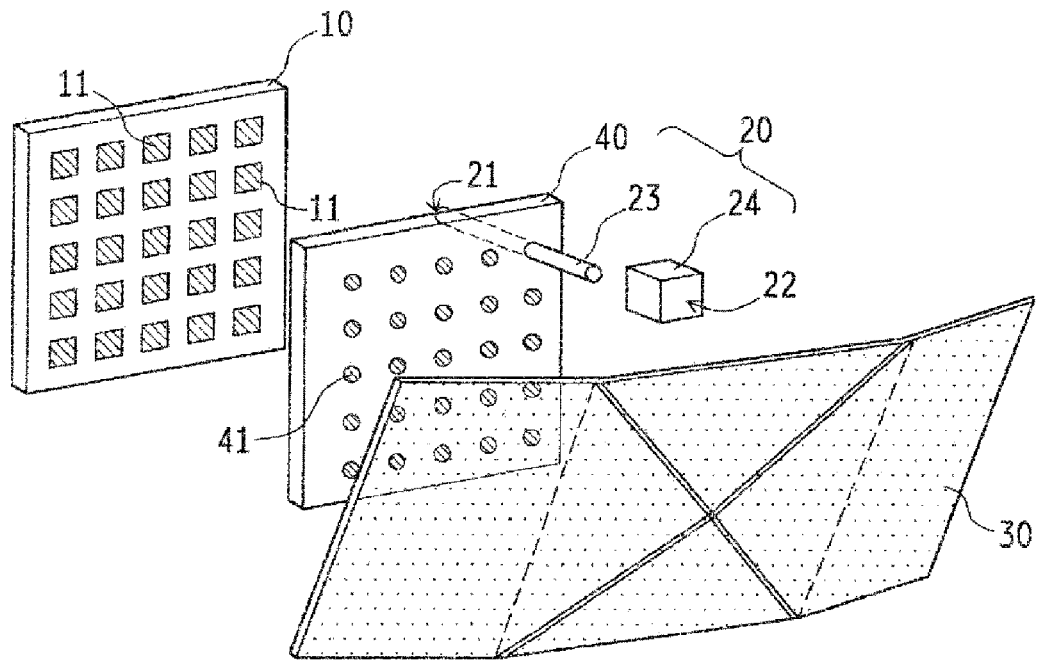
FIG. 3 is an exploded perspective view showing a three-dimensional surface display device 120 according to one or more embodiments of the present invention.

Next, another embodiment of the present invention will be described with reference to FIG. 3. Descriptions that are the same as those of the previous embodiment will be omitted. FIG. 3 is an exploded perspective view showing a three-dimensional surface display device 120 according to the present embodiment. The three-dimensional surface display device 120 of the present embodiment includes the mounting member 10, the light guide portions 20, the outer panel 30, and a fiber holding member 40. The present embodiment is different from the previous embodiment in that the plurality of optical fibers 23 are held by the fiber holding member 40.

The fiber holding member 40 is a member having a substantially flat plate shape in which a plurality of insertion holes 41 are formed, and is a member for inserting and holding the optical fibers 23 in respective insertion holes 41. The fiber holding member 40 has substantially the same shape as the mounting member 10, and is formed with the insertion holes 41 at positions corresponding to the light emitting elements 11. In FIG. 3, one optical fiber 23 and one columnar member 24 are described for simplification, but the three-dimensional surface display device 120 includes the same number of optical fibers 23 and columnar members 24 as the light emitting elements 11.

The insertion hole 41 is a hole provided so as to penetrate from one surface to a back surface of the fiber holding member 40, and a diameter thereof is substantially the same as an outer diameter of the optical fiber 23. In addition, a center of the insertion hole 41 is a position corresponding to a light emission center of the corresponding light emitting element 11 on the mounting member 10. The fiber holding member 40 is arranged to face the mounting member 10 in a state in which the optical fibers 23 are inserted and held in respective insertion holes 41, and the light incidence surfaces 21 of the optical fibers 23 are held so as to face the light emitting elements 11.

In the three-dimensional surface display device 120 according to the present embodiment, since the plurality of optical fibers 23 are held by using the fiber holding member 40 to face the respective light emitting element 11, optical axes of each optical fiber 23 and the corresponding light emitting element 11 are easily aligned. In addition, since the plurality of optical fibers 23 are collectively held by the fiber holding member 40, the optical fibers 23 having a flexibility can be easily handled even when the three-dimensional surface display device 120 is assembled.

FIG. 3 shows an example in which one fiber holding member 40 is provided, but a plurality of fiber holding members 40 may be provided to hold intermediate positions of the optical fibers 23. In this case, in the fiber holding member 40 holding the vicinity of the light incidence surfaces 21, the insertion holes 41 are formed at positions corresponding to the light emitting elements 11, but a size of the fiber holding member 40 holding the intermediate positions of the optical fibers 23 is not limited, and an interval between the insertion holes 41 may be narrowed to bundle the optical fibers 23.

Figure 4:
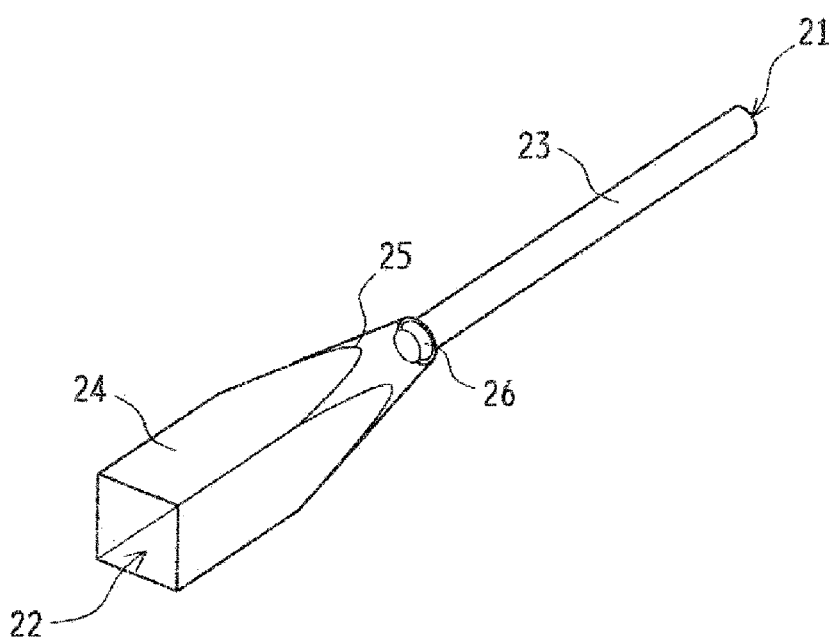
FIG. 4 is a schematic perspective view showing a light guide portion 20 in one or more embodiments of the present invention.

Next, another embodiment of the present invention will be described with reference to FIG. 4. FIG. 4 is a schematic perspective view showing the light guide portion 20 in the present embodiment. In the present embodiment, a configuration of the light guide portion 20 is different from that of the previous embodiment, and the other configurations are same as those of the previous embodiment, and therefore the same description will be omitted.

As shown in FIG. 4, in the present embodiment, the light guide portion 20 includes the optical fiber 23 and the columnar member 24, and a light expanding portion 25 having a diameter reduced toward the optical fiber 23 is provided on a side of the columnar member 24 to which the optical fiber 23 is connected. In addition, a fiber insertion portion 26 for inserting and fixing a light emitting side end surface of the optical fiber 23 is formed at a tip end of the light expanding portion 25.

In the light expanding portion 25, one side has a circular cross section approximate to an outer diameter of the optical fiber 23, and the other side has the same cross-sectional shape as the light extraction surface 22, and the light expanding portion 25 has a shape whose a diameter increases from the optical fiber 23 side toward the light extraction surface 22 direction. In other words, the light expanding portion 25 has a shape in which a part of the columnar member 24 is cut out at a conical side surface.

The fiber insertion portion 26 is a substantially cylindrical concave portion provided on one end side of the light expanding portion 25, and an inner diameter thereof is substantially the same as the outer diameter of the light emitting end surface of the optical fiber 23. A depth of the concave portion of the fiber insertion portion 26 is preferably about several mm in order to insert and fix a light emitting end side of the optical fiber 23. In a state in which the light emitting end side of the optical fiber 23 is inserted into the fiber insertion portion 26, the optical fiber 23 and the fiber insertion portion 26 are fixed by applying an adhesive or the like around a connection portion.

A concave portion having a conical shape or the like is formed on the light extraction surface 22 side of the fiber insertion portion 26, and a gap is formed between a material forming the light expanding portion 25 and the light emitting end surface of the optical fiber 23. The light expanding portion 25 has a function of increasing a light diameter in the same manner as a concave lens due to a difference in a refractive index of the gap between the material forming the light expanding portion 25 and the concave portion. Therefore, the light incident to the light expanding portion 25 from the light emitting end surface of the optical fiber 23 propagates inside the light expanding portion 25 while the light diameter being expanded to substantially the entire area of the light extraction surface, and is extracted from the light extraction surface 22 of the columnar member 24 to the outside.

In side surface portions of the columnar member 24 and the light expanding portion 25, since the light propagating inside is substantially totally reflected due to the difference in the refractive index, there is no leakage of light from the side surface portions. In addition, a reflective film may be formed on a side surface, so that the light propagating inside the columnar member 24 and the light expanding portion 25 does not leak from the side surface portions. In order to reduce the directivity of the light extracted to the outside from the light extraction surfaces 22 and improve the visibility from the multiple directions, it is preferable to form the light scattering structure for scattering and extracting the light such as minute unevenness on the surfaces of the light extraction surfaces 22. In addition, FIG. 4 shows an example in which the light expanding portion 25 is integrally configured as a part of the columnar member 24, but the columnar member 24 and the light expanding portion 25 may be configured separately.

Figure 5A:
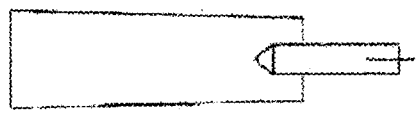
FIG. 5A is a schematic sectional view showing shapes of an optical fiber 23, a light expanding portion 25, and a fiber insertion portion 26.
Figure 5A:
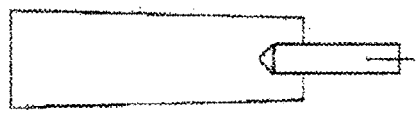
Figure 5A:
Figure 5A:
Figure 5B:
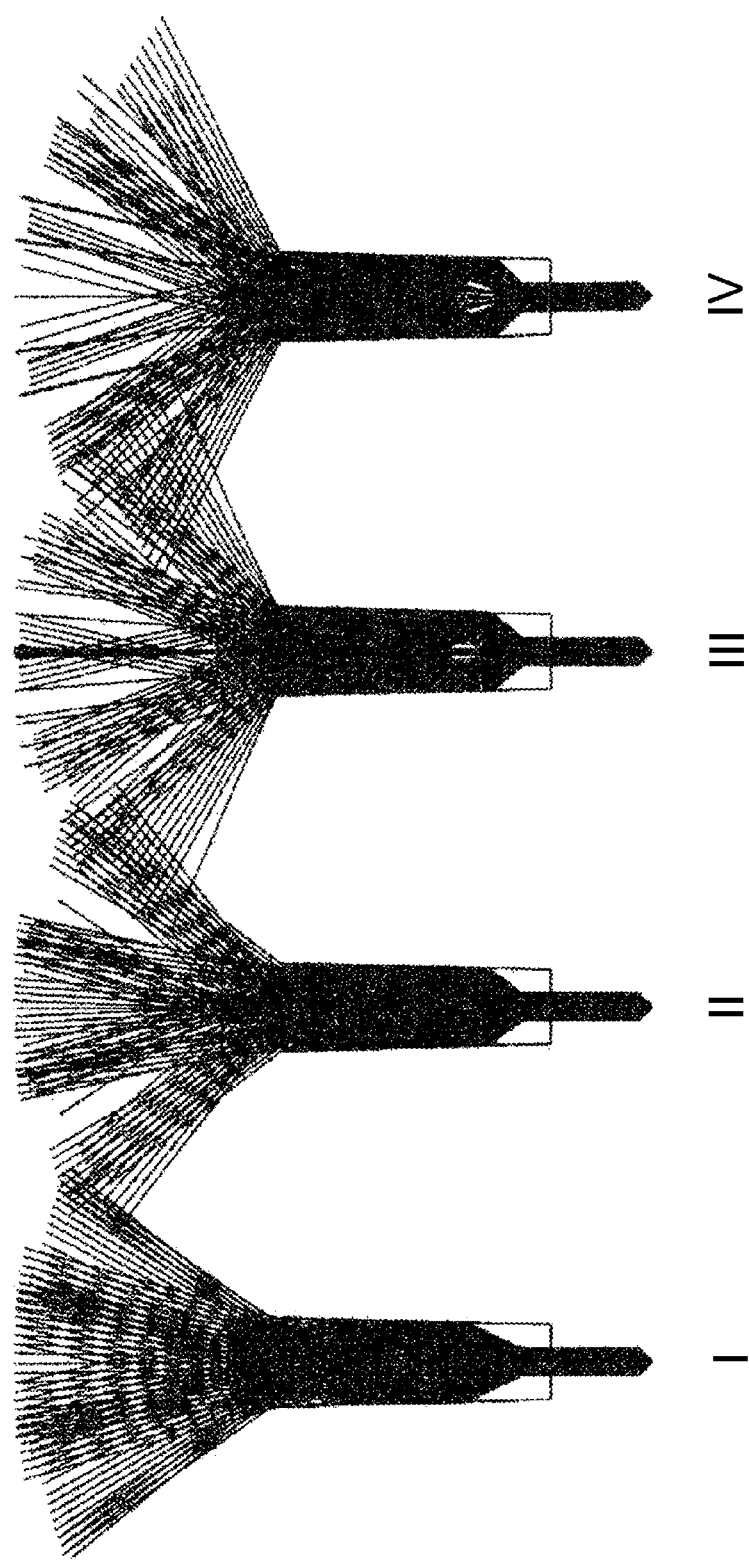
FIG. 5B is a schematic view showing a simulation result of light expansion.

FIG. 5A is a schematic sectional view showing shapes of the optical fiber 23, the light expanding portion 25, and the fiber insertion portion 26, and FIG. 5B is a schematic view showing a simulation result of light expansion. In I to IV of FIGS. 5A and 5B, the optical fibers 23 and the light expanding portions 25 have the same shape, and a height of the conical shape of a gap portion formed at the tip end of the fiber insertion portion 26 is changed. From results of simulating a light ray trajectory shown in FIG. 5B, it can be seen that expansion of the light diameter and a light distribution can be controlled by the conical shape of the gap portion formed at the tip end of the fiber insertion portion 26.

Figure 6A:
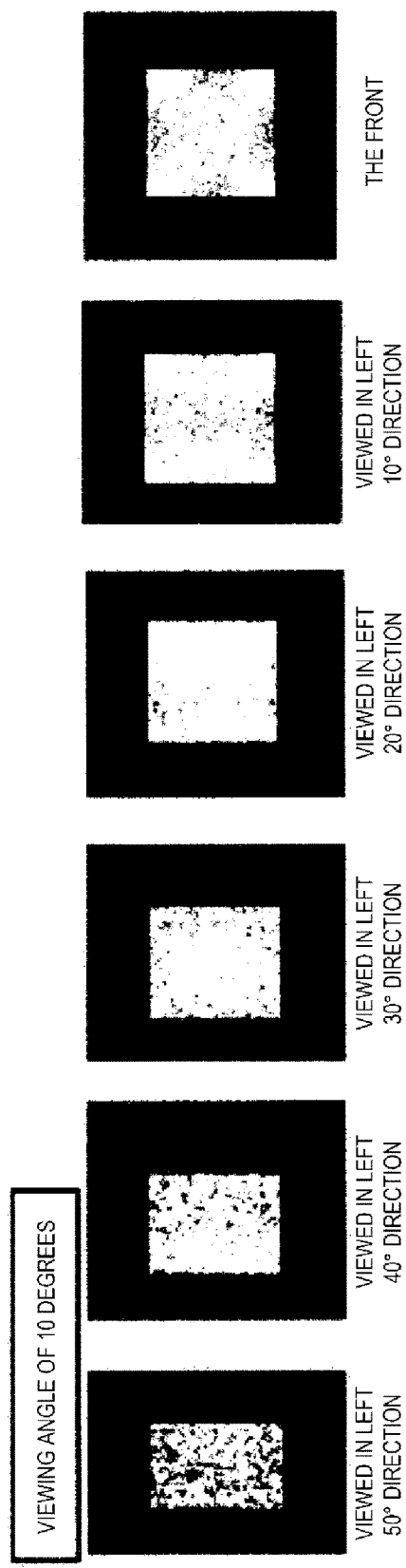
FIG. 6A is a schematic view showing a result of simulating a visibility on a light extraction surface of the light guide portion 20, and shows a case of being viewed from a position with a viewing angle of 10 degrees.
Figure 6B:
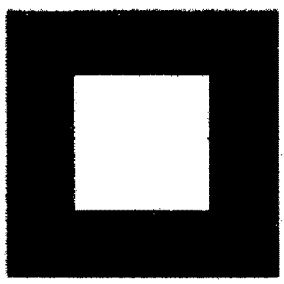
FIG. 6B is a schematic view showing a result of simulating the visibility on the light extraction surface of the light guide portion 20, and shows a case of being viewed from a position with the viewing angle of 20 degrees.
Figure 6B:
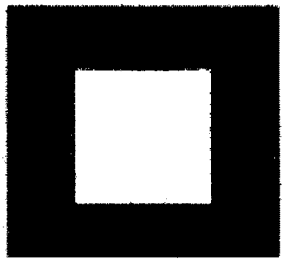
Figure 6B:
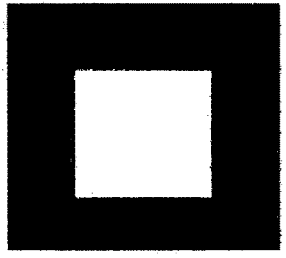
Figure 6B:
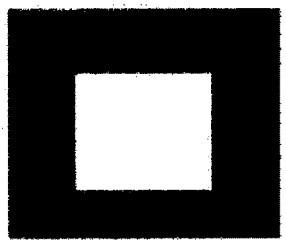
Figure 6B:
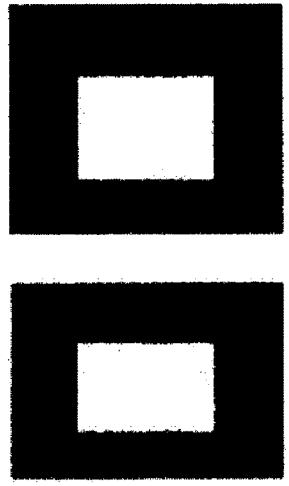

FIGS. 6A and 6B are schematic views showing results of simulating a visibility on the light extraction surface of the light guide portion 20, and FIG. 6A shows a case of being viewed from a position within a viewing angle of 10 degrees, and FIG. 6B shows a case of being viewed from a position within the viewing angle of 20 degrees. FIGS. 6A and 6B show the visibility from the front position of the light extraction surface 22 and the visibility from a direction inclined by 10 to 50 degrees from the front position to the left. It can be seen from FIGS. 6A and 6B that the satisfactory light emission from substantially the entire area of the light extraction surface 22 can be satisfactorily visually recognized regardless of the viewing angle and a visual direction.

In the present embodiment, since the light expanding portion 25 is provided between the optical fiber 23 and the columnar member 24, the light diameter can be expanded from the optical fiber 23 to substantially the entire area of the light extraction surface 22, and the visibility of the light extraction surface 22 can be improved.

By inserting and fixing the light emitting end side of the optical fiber 23 into the fiber insertion portion 26, the optical fiber 23 and the light expanding portion 25 can be satisfactorily fixed, and optical coupling therebetween can be maintained. In addition, by appropriately designing a shape of the gap provided at the tip end of the fiber insertion portion 26, the light diameter expansion at the light expanding portion 25 and the columnar member 24 can be set.

Figure 7:
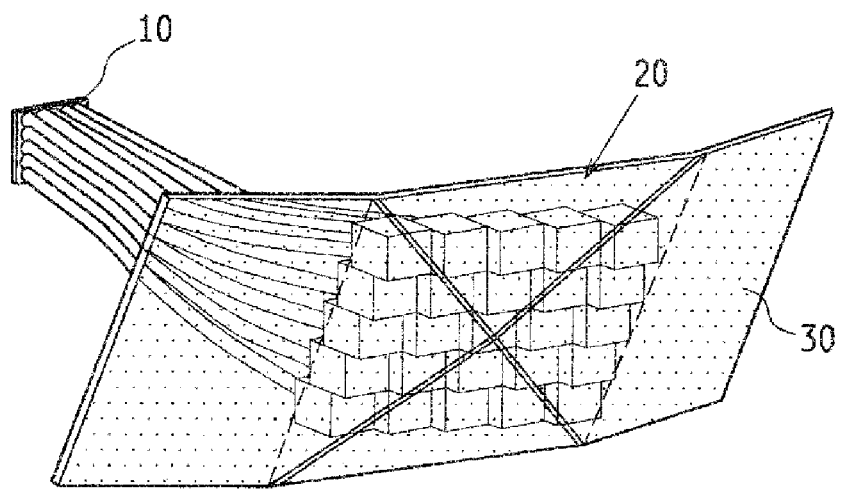
FIG. 7 is a schematic perspective view showing a three-dimensional surface display device 130 according to one or more embodiments of the present invention.

Next, another embodiment of the present invention will be described with reference to FIG. 7. Descriptions that are the same as those of the previous embodiment will be omitted. FIG. 7 is a schematic perspective view showing a three-dimensional surface display device 130 according to the present embodiment. Also in the present embodiment, the three-dimensional surface display device 130 includes the mounting member 10, the light guide portions 20, and the outer panel 30, and each of the light guide portions 20 includes the optical fiber 23 and the columnar member 24.

In the present embodiment, as shown in FIG. 7, a size of the mounting member 10 is smaller than the total area of the light extraction surface 22, and the light incidence surface 21 side of the optical fibers 23 is bundled and faces the light emitting elements 11 of the mounting member 10.

Since the diameter of the optical fiber 23 is as small as several tens of μm to several mm, even if the size of the mounting member 10 is reduced and the interval between the light emitting elements 11 is narrowed, the light incidence surfaces 21 can be made to face the light emitting elements 11, respectively. In addition, since the optical fiber 23 has the flexibility, the light emitting end surface side can be connected to a center position of the columnar member 24 with the mutual interval therebetween increased. Accordingly, it is possible to realize a large-screen three-dimensional surface display by increasing the total area of the light extraction surfaces 22 while reducing the size of the mounting member 10 to realize space saving and weight reduction.

The present invention is not limited to the embodiments described above, and various modifications can be made within the scope of the claims, and embodiments obtained by appropriately combining technical means disclosed in the different embodiments are also included in the technical scope of the present invention.

The present application incorporates contents disclosed in Japanese Patent Application (Japanese Patent Application No. 2017-075753) filed on Apr. 6, 2017.

The invention claimed is:

1. A three-dimensional surface display device comprising:
    a plurality of light emitting elements which are mounted on a mounting member; and
    a plurality of light guide portions, each of which includes a light incidence surface on one end side and a light extraction surface on the other end side, and is arranged to face the corresponding light emitting element,
    wherein the plurality of light guide portions have different lengths,
    wherein the light extraction surfaces are arranged three-dimensionally adjacent to each other,
    wherein each of the plurality of light guide portions comprises a translucent columnar member, and one end surface of the columnar member is the light extraction surface,
    wherein each of the plurality of light guide portions comprises an optical fiber, and
    wherein the length of each of the plurality of light guide portions is adjustable.

2. The three-dimensional surface display device according to claim 1, further comprising:

a light expanding portion configured to expand a diameter of light emitted from a light emitting end surface of the optical fiber to substantially the entire area of the light extraction surface.

3. The three-dimensional surface display device according to claim 1,
wherein the light extraction surface is formed with a light scattering structure for scattering and extracting light.

4. The three-dimensional surface display device according to claim 1, further comprising:
a three-dimensional shaped outer panel formed of a translucent material,
wherein the light extraction surfaces are arranged along an inner surface of the outer panel.

5. A vehicle display device including the three-dimensional surface display device according to claim 4,
wherein the outer panel is arranged on an exterior portion of a vehicle.

* * * * *